United States Patent
Hayasaka

(10) Patent No.: US 10,732,923 B2
(45) Date of Patent: Aug. 4, 2020

(54) INFORMATION PROCESSOR, AUDIO DEVICE, AND PROGRAM

(71) Applicant: TEAC CORPORATION, Tokyo (JP)

(72) Inventor: Kaname Hayasaka, Tokyo (JP)

(73) Assignee: TEAC CORPORATION, Tokyo (JP)

(*) Notice: Subject to any disclaimer, the term of this patent is extended or adjusted under 35 U.S.C. 154(b) by 0 days.

(21) Appl. No.: 15/899,917

(22) Filed: Feb. 20, 2018

(65) Prior Publication Data

US 2018/0314485 A1 Nov. 1, 2018

(30) Foreign Application Priority Data

Apr. 26, 2017 (JP) ................. 2017-087347

(51) Int. Cl.
| | |
|---|---|
| *G06F 17/00* | (2019.01) |
| *G06F 3/16* | (2006.01) |
| *G06F 9/48* | (2006.01) |
| *G06F 9/52* | (2006.01) |

(52) U.S. Cl.
CPC .............. *G06F 3/16* (2013.01); *G06F 3/165* (2013.01); *G06F 9/485* (2013.01); *G06F 9/4881* (2013.01); *G06F 9/52* (2013.01)

(58) Field of Classification Search
CPC ............ G06F 3/16; G06F 3/162; G06F 3/165
See application file for complete search history.

(56) References Cited

U.S. PATENT DOCUMENTS

| | | | | |
|---|---|---|---|---|
| 5,168,481 A | * | 12/1992 | Culbertson | G11B 19/00 369/2 |
| 5,319,618 A | * | 6/1994 | Krikorian | G11B 27/002 360/61 |
| 5,502,703 A | | 3/1996 | Yamada et al. | |
| 7,865,256 B2 | * | 1/2011 | Suzuki | G10H 7/02 700/94 |
| 2003/0039176 A1 | * | 2/2003 | DePoalo | G11B 25/043 369/4 |
| 2005/0259532 A1 | * | 11/2005 | Roman | G11B 27/038 369/47.1 |
| 2009/0228897 A1 | * | 9/2009 | Murray | G06F 9/544 719/313 |
| 2010/0110843 A1 | * | 5/2010 | Kamei | G11B 27/105 369/1 |

(Continued)

FOREIGN PATENT DOCUMENTS

| | | |
|---|---|---|
| CN | 1959828 A | 5/2007 |
| CN | 103190092 A | 7/2013 |

(Continued)

*Primary Examiner* — Joseph Saunders, Jr.
(74) *Attorney, Agent, or Firm* — Seed IP Law Group LLP

(57) ABSTRACT

A desired range of an audio file is repeatedly reproduced without a need to store sound data of a predetermined period in a memory in advance and without causing an interruption or a time lag. A CPU of an audio device activates at least two media players A and B for reproducing an audio file. During reproduction of the audio file by the media player A, the media player B is set to a wait state, and, in response to completion of the reproduction of the audio file by the media player A, the wait state of the media player B is automatically released and reproduction of the audio file is started, to achieve repeat reproduction.

8 Claims, 6 Drawing Sheets

(56) References Cited

U.S. PATENT DOCUMENTS

| | | | |
|---|---|---|---|
| 2010/0165815 A1* | 7/2010 | Wilson | G11B 27/105 369/86 |
| 2011/0002479 A1* | 1/2011 | Camiel | H04H 60/04 381/81 |
| 2011/0301728 A1* | 12/2011 | Hamilton | G11B 27/034 700/94 |
| 2012/0042047 A1 | 2/2012 | Chen et al. | |
| 2013/0266155 A1* | 10/2013 | Mashita | H04R 3/00 381/119 |
| 2015/0262613 A1* | 9/2015 | Demerchant | G11B 27/105 386/230 |
| 2016/0378324 A1* | 12/2016 | Gaunt | G06F 3/0484 715/716 |

FOREIGN PATENT DOCUMENTS

| | | |
|---|---|---|
| JP | 7-65506 A | 3/1995 |
| JP | 8-107540 A | 4/1996 |
| JP | 11-86447 A | 3/1999 |
| JP | 2003-157621 A | 5/2003 |

\* cited by examiner

INFORMATION PROCESSOR, AUDIO DEVICE, AND PROGRAM

CROSS REFERENCE TO RELATED APPLICATION

The disclosure of Japanese Patent Application No. 2017-087347 filed on Apr. 26, 2017, including the specification, claims, drawings, and abstract, is incorporated herein by reference in its entirety.

TECHNICAL FIELD

The present disclosure relates to an information processor, an audio device, and a program.

BACKGROUND

In the related art, various repeat techniques in an audio device have been proposed.

JP H07-065506 A discloses a technique in which a first memory which stores reproduction data from a repeat reproduction start position to a predetermined position, and a second memory which stores the reproduction data from the predetermined position to a repeat reproduction end position are used, and the reading/writing of the reproduction data with respect to the memories are controlled, so that the reproduced sound is not interrupted during a search operation of an optical pickup during repeat reproduction.

JP H08-107540 A discloses a technique in which reproduction data are stored in a memory while a reading start address during a repeat reproduction is updated based on a predetermined return time, and, when an operation of a button for instructing repeat reproduction is detected, the reproduction data are read from the stored reading start address of the memory, so as to start repeat reproduction without causing a time lag.

JP H11-086447 A discloses that, when a repeat reproduction range does not exceed a storage capacity of a memory, reproduction data between a repeat start point and a repeat end point stored in the memory are repeatedly output, and, when the range exceeds the storage capacity of the memory, a provisional end point is set between the repeat start point and the repeat end point, and overwriting of the reproduction data between the start point and the provisional end point is prohibited, so that the reproduction signal is not interrupted during the repeat reproduction.

JP 2003-157621 A discloses a technique in which reproduction data of a predetermined time period from a top of a repeat reproduction region are stored in a shockproof memory as in-repeat reproduction region particular data, and, during the repeat reproduction, the in-repeat reproduction region particular data are read from the shockproof memory and the other data are read from a recording medium, so that the reproduction signal is not interrupted.

All of the techniques of related art prevents interruption of the reproduction signal or generation of a time lag basically by storing in the memory sound data of a predetermined time period from a starting point of the repeat reproduction. However, as there is uncertainty in terms of timing; i.e., whether the user reproduces after indicating his will to request repeat or indicates his will to request repeat after starting the reproduction, the sound data of the predetermined period must always be stored in the memory, regardless of whether or not there is an intention of the repeat request. In addition, when the repeat reproduction range exceeds the storage capacity of the memory, a technique is necessary to connect the sound data stored in the memory and other, new reproduction sound data without a noise or a silence. Such a problem may occur not only in the repeat reproduction of an audio file, but also in any switching of jobs (processes) to be executed.

SUMMARY

The present disclosure provides a technique which can resolve a time lag when jobs (processes) to be executed are switched. More specifically, the present disclosure provides a technique in which a desired range of an audio file can be repeatedly reproduced without the need for storing sound data of a predetermined period in the memory in advance and without causing the interruption or the time lag.

According to one aspect of the present disclosure, there is provided an information processor comprising: a storage unit that stores at least a first application and a second application for executing a job; and a controller that activates the first application and the second application, that sets the second application to a wait state during execution of the job by the first application, and that automatically releases the wait state of the second application and executes the job in response to completion of the execution of the job by the first application.

According to another aspect of the present disclosure, there is provided an audio device comprising: a storage unit that stores at least a first player application and a second player application for reproducing an audio file; and a controller that activates the first player application and the second player application, that sets the second player application to a wait state during reproduction of the audio file by the first player application, and that automatically releases the wait state of the second player application and starts reproduction of the audio file in response to completion of the reproduction of the audio file by the first player application.

According to another aspect of the present disclosure, the controller is configured to: start reproduction of the audio file from a start point by the first player application and set the second player application to the wait state at the start point; in response to completion of the reproduction of the audio file to an end point by the first player application, automatically release the wait state of the second player application, start reproduction of the audio file, and set the first player application to a wait state at the start point; and, in response to completion of the reproduction of the audio file to an end point by the second player application, automatically release the wait state of the first player application and start reproduction of the audio file.

According to another aspect of the present disclosure, the controller is configured to: start reproduction of the audio file from an arbitrary start point by the first player application and set the second player application to a wait state at the start point; in response to completion of the reproduction of the audio file to an arbitrary end point by the first player application, automatically release the wait state of the second player application, start reproduction of the audio file from the start point, and set the first player application to a wait state at the start point; and, in response to completion of the reproduction of the audio file to the end point by the second player application, automatically release the wait state of the first player application and start reproduction of the audio file from the start point.

According to another aspect of the present disclosure, the controller is configured to: start reproduction of the audio file from an arbitrary first start point by the first player application and set the second player application to a wait state at an arbitrary second start point; in response to completion of the reproduction of the audio file to an arbitrary first end point by the first player application, automatically release the wait state of the second player application, start reproduction of the audio file from the second start point, and set the first player application to a wait state at the first start point; and, in response to completion of the reproduction of the audio file to an arbitrary second end point by the second player application, automatically release the wait state of the first player application and start reproduction of the audio file from the first start point.

According to another aspect of the present disclosure, the controller is configured to: start reproduction of a first audio file from an arbitrary first start point by the first player application and set the second player application to a wait state at an arbitrary second start point of a second audio file; in response to completion of the reproduction of the first audio file to an arbitrary first end point by the first player application, automatically release the wait state of the second player application, start reproduction of the second audio file from the second start point, and set the first player application to a wait state at the first start point of the first audio file; and, in response to completion of the reproduction of the second audio file to an arbitrary second end point by the second player application, automatically release the wait state of the first player application and start reproduction of the first audio file from the first start point.

According to another aspect of the present disclosure, the controller is configured to: automatically release the wait state of the second player application and set a stopped state in response to completion of the reproduction of the audio file by the first player application, when there is no repeat reproduction request from a user.

According to another aspect of the present disclosure, there is provided a recording medium which stores a program which, when executed, causes a processor of a computer to execute the steps of: activating at least a first player application and a second player application for reproducing an audio file; setting the second player application to a wait state during reproduction of the audio file by the first player application; and, in response to completion of the reproduction of the audio file by the first player application, automatically releasing the wait state of the second player application and starting reproduction of the audio file.

According to the present disclosure, the time lag when switching the jobs (processes) to be executed can be resolved. In addition, according to the present disclosure, a desired range of an audio file can be repeatedly reproduced without the need to store sound data of a predetermined time period in a memory in advance and without causing an interruption or a time lag.

BRIEF DESCRIPTION OF DRAWINGS

Embodiment(s) of the present disclosure will be described by reference to the following figures, wherein.

DESCRIPTION OF EMBODIMENTS

<Structure>

An embodiment of the present disclosure will now be described by reference to the drawings, exemplifying a configuration in which repeat reproduction is executed in a technique in which an audio interface device and a computer are connected, various audio signals are captured from the audio interface device and supplied to the computer, and the computer suitably edits the audio signals or the like and records the sound, or outputs the same to the outside via the Internet (Internet live broadcasting).

Figure 1:
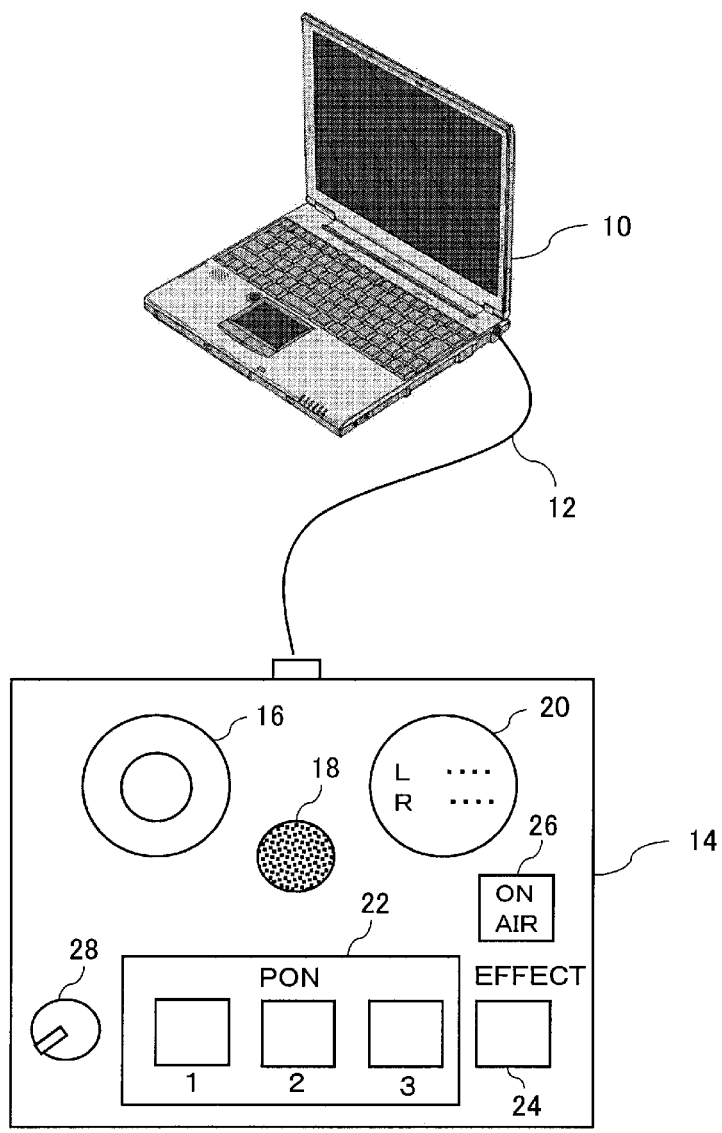
FIG. 1 is a system structural diagram in an embodiment of the present disclosure.

FIG. 1 is a system structural diagram of an embodiment of the present disclosure. An audio system according to the present embodiment comprises a personal computer (PC) 10 and an audio interface device 14. The PC 10 and the audio interface device 14 are connected to each other, for example, by a USB cable 12, in a manner to allow mutual transmission and reception of data.

The PC 10 functions as an audio device according to the present embodiment. In the PC 10, software for inputting, editing, and outputting audio data are installed, and input, output, editing, and reproduction of the audio data are executed using the software. The reproduction includes repeat reproduction.

The audio interface device 14 comprises an amplifier, and analog input terminals and analog output terminals of a plurality of channels, and transmits and receives an audio signal and various control signals to and from the PC 10. The audio interface device 14 comprises a microphone input terminal 16, a built-in microphone 18, a level meter 20, and a headphone output adjustment button 28, and further comprises an immediate output (PON) switch 22 comprising a plurality of buttons, an effect switch 24 which generates various sound effects, and an on-air switch 26.

The immediate output switch 22 comprises three immediate output switches including "immediate output 1," "immediate output 2," and "immediate output 3." When the user presses the immediate output switch 22, the audio interface device 14 supplies a reproduction and output command signal to the PC 10, and the PC 10 reproduces and outputs an audio signal according to the reproduction and output command signal. When the PC 10 is connected to the Internet and the audio signal reproduced by the PC 10 can be output to the outside via the Internet (Internet live broadcasting), with the user operating the immediate output switch 22 while the on-air switch 26 is in an ON state, the audio signal is reproduced and output to the Internet. Desired audio files may be assigned in advance to the three switches of the immediate output switch 22; that is, the "immediate output 1," the "immediate output 2," and the "immediate output 3." The user can press one of the three immediate output switches; that is, the "immediate output 1," the "immediate output 2," and the "immediate output 3," to control the PC 10 to reproduce and output the audio file which is assigned in advance.

The effect switch 24 is a switch for adding a predetermined sound effect to the audio signal. The predetermined sound effect may be arbitrary, and, for example, the process may be a process to add a reverb (reverberation sound).

The on-air switch 26 is a switch for instructing the PC 10 to output in real time via the Internet. By the user operating the on-air switch 26 to the ON state, for example, it becomes possible to output an audio signal, which is input from the microphone input terminal 16, to the Internet, or to reproduce the audio file assigned in advance to the "immediate output 1" and to output the same to the Internet by the user operating the "immediate output 1."

Figure 2:
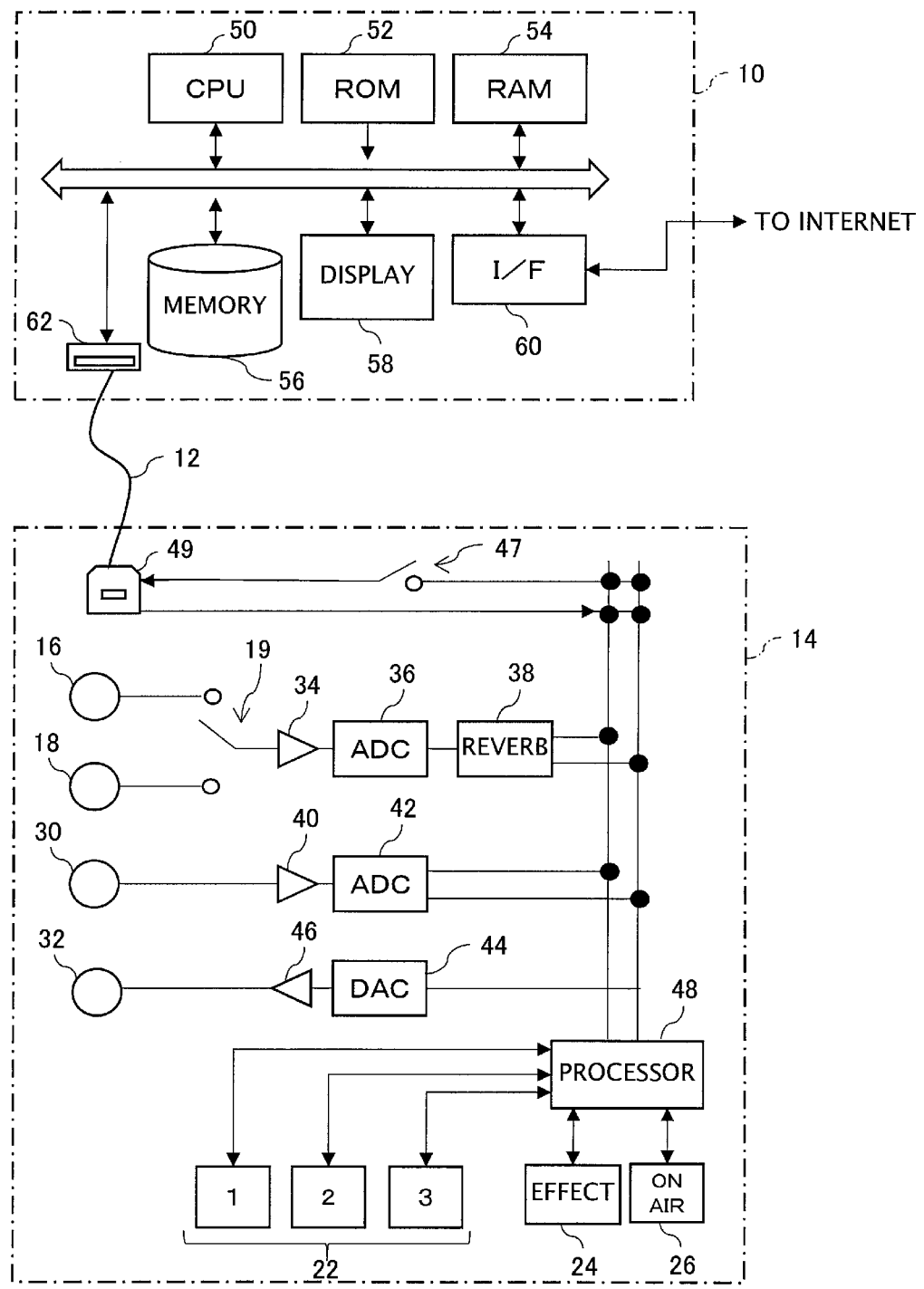
FIG. 2 is a structural block diagram in the embodiment of the present disclosure.

FIG. 2 is a structural block diagram of the system according to the present embodiment.

The PC 10 comprises one or more CPUs 50, a ROM 52, a RAM 54, a memory 56, a display 58, a communication interface I/F 60, and a USB connector 62. In addition to these elements, the PC 10 comprises a known input/output interface such as a mouse, a keyboard, or the like.

One or each of a plurality of the CPUs 50 reads a processing program stored in the ROM 52 or in a hard disk drive, or the like, and realizes various functions of the present embodiment by executing the processing program using the RAM 54 as a working memory. In particular, when reproducing the audio file, the CPU 50 activates reproduction software and reproduces the audio file. On the other hand, when repeatedly reproducing the audio file, the CPU 50 simultaneously activates and controls a plurality of the reproduction software files stored in the hard disk drive or a semiconductor memory, to execute the repeat reproduction.

The memory 56 stores the audio file and other files. A format of the audio file is arbitrary, and is, for example, WAV or MP3. The other files are also arbitrary, and may be document data, image data, or video image data.

The display 58 displays various information based on a control command from the CPU 50. For example, the display 58 displays virtual switches corresponding to the switches of the audio interface device 14; more specifically, the immediate output switch 22, the effect switch 24, and the on-air switch 26, to achieve a cooperative operation with the audio interface device 14.

The communication interface I/F 60 is an interface for connecting to the Internet serving as a communication line. The connection with the Internet may be wired or wireless.

The USB connector 62 is a connector for USB-connecting to the audio interface device 14. In the drawings, connection with a USB connector 49 on the side of the audio interface device 14 via the USB cable 12 is schematically shown.

The CPU 50 assigns audio files desired by the user to the three switches of the immediate output switch 22 in advance, according to a user operation. Specifically, the CPU 50 correlates one of the files stored in the memory 56 and one of the switches of the immediate output switch 22 according to the user operation. For example, the CPU 50 correlates an audio file of "AAA.WAV" stored in the memory 56 to the "immediate output 1," and an audio file of "BBB.WAV" to the "immediate output 2." Here, "correlation" specifically refers to a process of registering a path of the audio file to the "immediate output 1." The user may cause, for example, a list of files stored in the memory 56 to be displayed on the display 58, and may assign (correlate) a desired audio file to the immediate output switch by dropping an icon of the desired audio file to the virtual switch corresponding to immediate output switch 22 by a drag-and-drop operation or the like.

The CPU 50 also supplies data showing the assignment state to the USB-connected audio interface device 14. With this process, the assignment state is shared between the PC 10 and the audio interface device 14.

The audio interface device 14 comprises, in addition to the microphone input terminal 16, the built-in microphone 18, the immediate output switch 22, the effect switch 24, and the on-air switch 26 described above, an external input terminal 30, an output terminal 32, selection switches 19 and 47, amplifiers 34, 40, and 46, analog-to-digital converters (ADCs) 36 and 42, a digital-to-analog converter (DAC) 44, a reverb adder (REVERB) 38, and a processor 48.

Audio signals which are input from the microphone input terminal 16 and the built-in microphone 18 are selectively switched by the selection switch 19, and are converted into digital audio signals by the ADC 36 through the amplifier 34. To the digital audio signal, the reverb is suitably added by the reverb adder 38 according to an operation of the effect switch 24 by the user, and the digital audio signal is output to a stereo bus. An audio signal which is input from the external input terminal (AUX IN) 30 is converted into a digital audio signal by the ADC 42 through the amplifier 40, and is output to the stereo bus.

The audio signals which are input from the microphone input terminal 16, the built-in microphone 18, and the external input terminal 30, or the audio signals which are supplied from the PC 10 are converted into analog audio signals by the DAC 44 through the stereo bus, and are output from the output terminal 32 such as a headphone terminal or the like through the amplifier 46. A gain of the amplifier 46 is adjusted by the headphone output adjustment button 28.

The USB connector 49 for connecting to the PC 10 is connected to the stereo bus through the selection switch 47. The selection switch 47 cooperates with the on-air switch 26. When the on-air switch 26 is operated to the ON state, a connection point is switched ON, and the output of the audio signal from the audio interface device 14 to the PC 10 is started. On the other hand, regardless of the operation of the on-air switch 26, the control signal from the PC 10 to the audio interface device 14 is supplied to the processor 48.

The processor 48 controls operations of various parts of the audio interface device 14. The processor 48 controls the operations according to the operation signals from the immediate output switch 22, the effect switch 24, and the on-air switch 26. Specifically, the processor 48 outputs a reproduction command signal to the PC 10 in response to the operation signal from the immediate output switch 22. When the "immediate output 1" of the immediate output switch 22 is pressed, a reproduction command signal for the "immediate output 1" is output, when the "immediate output 2" is pressed, a reproduction command signal for the "immediate output 2" is output, and when the "immediate output 3" is pressed, a reproduction command signal for the "immediate output 3" is output. The reproduction command signal includes a level signal corresponding to the pressing force when the immediate output switch 22 is pressed. The level signal is a signal which controls the volume when the audio file is reproduced and output. In addition to the volume, the effect or the tune may be controlled according to the pressing force. When the CPU 50 of the PC 10 receives these reproduction command signals, the CPU 50 reproduces the audio file which is assigned to the "immediate output 1," the "immediate output 2," or the "immediate output 3" in advance, and outputs the audio file in a volume level corresponding to the pressing force. Further, the CPU 50 activates the reverb adder 38 to add the reverb in response to the operation signal from the effect switch 24. Moreover, the CPU 50 outputs a signal output start (broadcast start) command signal or a signal output stop (broadcast stop) command signal to the PC 10 in response to the operation signal from the on-air switch 26, and controls switching ON and OFF of the selection switch 47.

<Assignment of Audio File>

Figure 3:
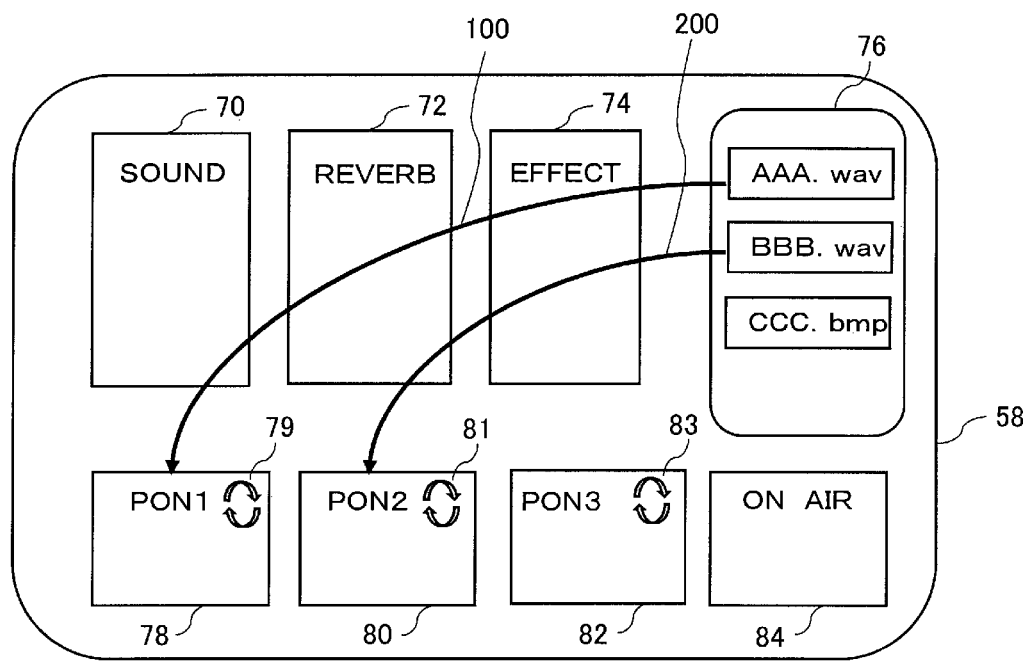
FIG. 3 is an explanatory diagram of assignment of an audio file in the embodiment of the present disclosure.

FIG. 3 is a schematic diagram showing assignment of a desired audio file to the immediate output switch 22 by the user on the PC 10.

The CPU 50 of the PC 10 displays on the display 58 a screen shown in FIG. 3 by executing a processing program. On the screen, virtual switches 78, 80, and 82 respectively corresponding to the three switches of the physical immediate output switch 22 of the audio interface device 14; that is, the "immediate output 1," the "immediate output 2," and the "immediate output 3," are displayed, and a virtual switch 84 corresponding to the physical on-air switch 26 of the audio interface device 14 is displayed. Icons 79, 81, and 83 at the top right of the respective virtual switches 78, 80, and 82 are icons for instructing a repeated reproduction of the assigned audio file. Display portions 70, 72, and 74 for displaying the volume (weak talk, strong talk, weak sing, strong sing, or the like), the reverb, and the effect (effects other than reverb) are also displayed. In addition, a list 76 of various files stored in the memory 56 is displayed. The file list 76 may be a list displayed on Explorer of Windows (registered trademark).

The user selects a file to be assigned to the immediate output switch 22 from among the files displayed in the file list 76, and assigns the file to one of the virtual switches 78~82 by a drag-and-drop operation. Alternatively, a configuration may be employed in which, when the virtual switches 78~82 are pressed, a file selection screen (such as the file list 76, a tree screen such as Explorer, or the like) is displayed.

For example, when an audio file, "AAA.WAV," is to be assigned to the "immediate output 1," the audio file, "AAA.WAV" is dragged and dropped to the virtual switch 78 corresponding to the "immediate output 1." In the drawings, an arrow 100 represents the drag-and-drop operation of the audio file, "AAA.WAV," to the virtual switch 78. When an audio file, "BBB.WAV," is to be assigned to the "immediate output 2," the audio file, "BBB.WAV," is dragged and dropped to the virtual switch 80 corresponding to the "immediate output 2." In the drawings, an arrow 200 shows the drag-and-drop operation of the audio file, "BBB.WAV," to the virtual switch 80.

When a file is assigned by the drag-and-drop operation, the CPU 50 may judge whether or not the assignment is normal, and may display a result of the judgment on the display 58.

Next, repeat reproduction of an audio file executed by one or a plurality of the CPUs 50 will be described.

<Repeat Reproduction>

Figure 4:
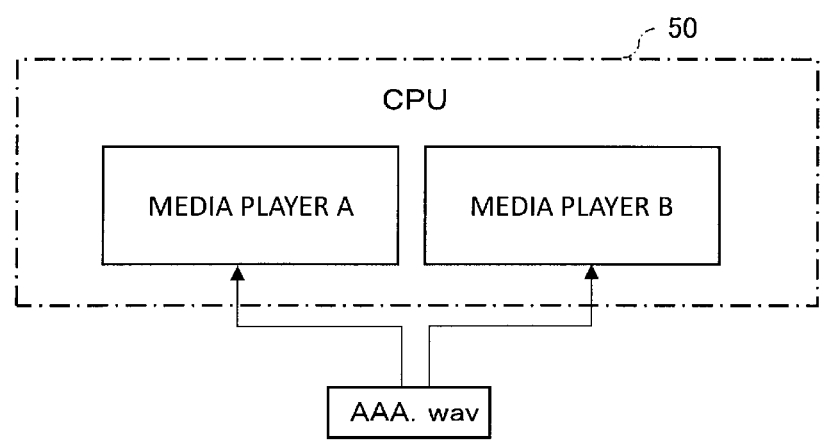
FIG. 4 is an explanatory diagram of execution of a plurality of media players by a CPU.

FIG. 4 schematically shows reproduction software that reproduces an audio file, executed by the CPU 50. When a certain audio file (in FIG. 4, "AAA.WAV" is exemplified) is reproduced, one or each of a plurality of CPUs 50 read two reproduction software files; more specifically, a media player A and a media player B, from a memory such as the hard disk drive and the semiconductor memory, and activates the reproduction software. The media player A functions as a first player application, and the media player B functions as a second player application. The media player A and the media player B are software of the same type. In the case of one CPU 50, the media players A and B may be processed in parallel in a time divisional manner, and, in the case of the plurality of CPUs 50, the media players A and B may be individually processed by the respective CPUs. The CPU 50 operates, for example, the media player A as a main player and the media player B as a sub player. When the audio file is reproduced, the audio file is first reproduced by the media player A, a pre-reproduction process for the media player B is completed, and the media player B is set to a wait state at a reproduction start position. When the audio file is not to be repeatedly reproduced, the process is completed in this state. On the other hand, when the audio file is to be repeatedly reproduced, the CPU 50 ends the media player A after the reproduction of the audio file, and at the same time, releases the wait state of the media player B which was set to the wait state, and reproduces the audio file by the media player B. In other words, in place of repeatedly reproducing the audio file with a single media player, the audio file is alternately reproduced by the two media players A and B, to execute the repeat reproduction.

Figure 5:
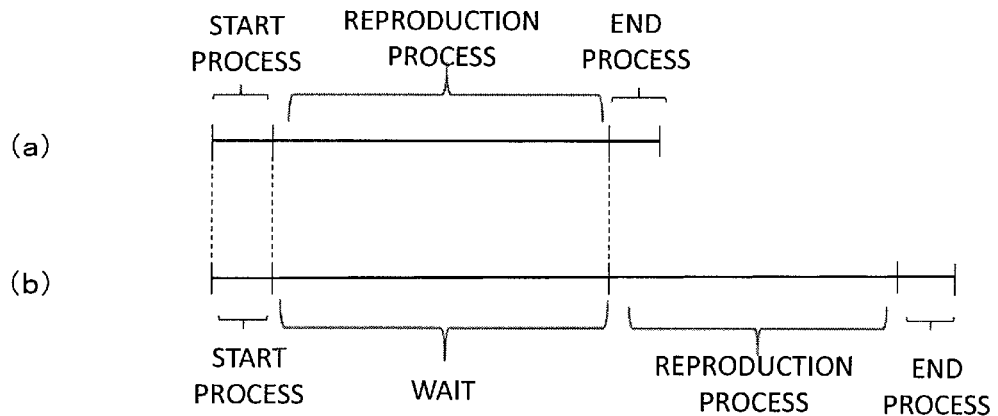
FIG. 5 is a timing chart showing execution states of two media players.

FIG. 5 schematically shows execution states of the media players A and B. FIG. 5A shows the execution state of the media player A, and FIG. 5B shows the execution state of the media player B.

When the CPU 50 receives the reproduction start command by the user pressing one of the immediate output switch 22, the CPU 50 activates both the media players A and B, and executes a predetermined start process. That is, the CPU 50 not only activates the media player A, but also automatically activates the media player B in connection with the media player A. After completion of the start process, the CPU 50 starts reproduction of the audio file from the start point by the media player A, and sets the media player B to the wait state of reproduction from the start point, after completion of the start process.

During the reproduction of the audio file by the media player A, the media player B is maintained in the wait state.

When an end point of the audio file is reached by the media player A and the reproduction is completed, an end process of the medial player A is executed. On the other hand, at this timing, the wait state of the media player B is released, and reproduction of the audio file from the start point by the media player B is started.

During reproduction of the audio file by the media player B, the start process is again execute for the media player A, and the media player A is set to a wait state of reproduction from the start point.

When the end point of the audio file is reached by the media player B and the reproduction is completed, an end process of the media player B is executed. On the other hand, at this timing, the wait state of the media player A is released, and reproduction of the audio file from the start point by the media player A is started.

These processes are repeatedly executed, and the repeat reproduction of the audio file is executed by alternately reproducing the audio file by the media players A and B.

Figure 6:
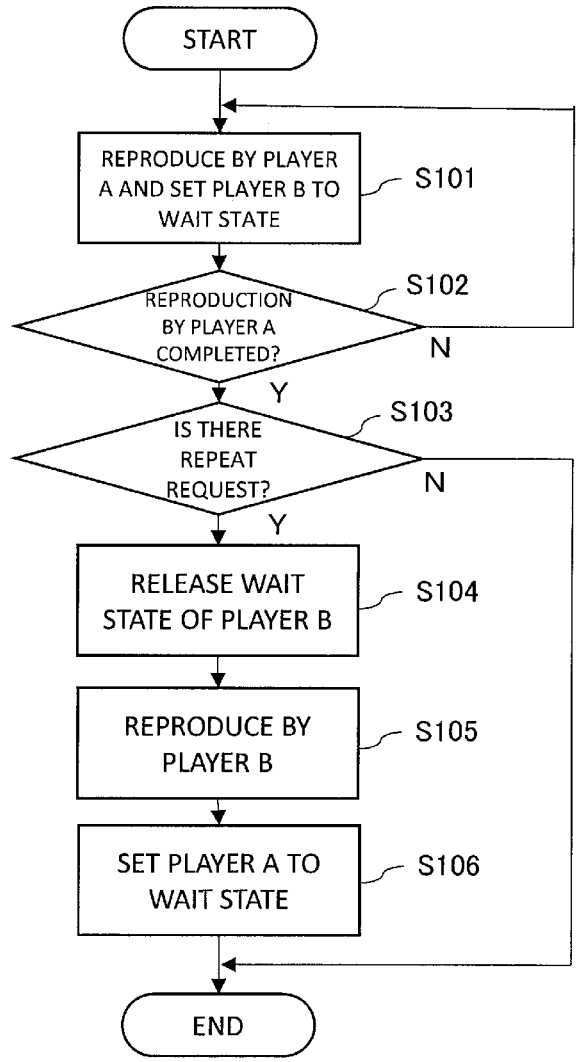
FIG. 6 is a process flowchart of repeat reproduction.

FIG. 6 shows a process flowchart of the CPU 50.

In response to a command from the user, the CPU 50 reproduces the audio file by the media player A, and sets the media player B to a wait state at a start point of the audio file (S101). Here, the wait state refers to a pause state or a temporarily stopped state, and a state in which the media player can immediately transition to the reproduction state from the wait state.

Next, the CPU 50 judges whether or not the reproduction by the media player A is completed (S102). Specifically, the CPU 50 judges whether or not the end point of the audio file is reached. When the end point of the audio file is not reached, the reproduction by the media player A is continued, and the media player B maintains the wait state at the start point of the audio file.

When the end point of the audio file is reached and the reproduction by the media player A is completed, next, the CPU 50 judges whether or not there is a repeat request from the user (S103).

Regardless of the timing of the repeat request (regardless of whether the request is made before the start of the reproduction of the audio file or during the reproduction), the process is completed if there is no repeat request. That is, the end process is executed for the media player A to stop the media player A, and the end process is executed from the wait state for the media player B, to stop the media player B.

On the other hand, if there is a repeat request, the CPU 50 releases the wait state of the media player B (S104), and starts reproduction of the audio file by the media player B (S105). The media player A is set to a wait state at the start point of the audio file (S106). When the reproduction by the media player B is completed, the audio file is again reproduced by the media player A, and the media player B is set to the wait state at the start point.

The CPU 50 does not need to notify the user that the audio file is being reproduced with two software files including the media players A and B, and, for example, only needs to display on the display 58 that the audio file is being reproduced by the media player A. In this case, the media player B may be considered to be reproducing the audio file in the background.

In the present embodiment, because the audio file is reproduced alternately by two media players A and B, it is not necessary to store the sound data of a predetermined period in the memory in advance, regardless of presence or absence of the repeat reproduction. In addition, because a configuration is employed in which, when the reproduction by one media player is completed, the other media player is released from the wait state and the reproduction is started, the repeat reproduction can be enabled without causing an interruption or a time lag, and without the need for executing a complex connection process of sound data.

In the above-described configuration, a case is described in which the audio file is repeatedly reproduced from the start point to the end point. Alternatively, a segment from an arbitrary start point to an arbitrary end point of the audio file may be repeatedly reproduced.

Figure 7:
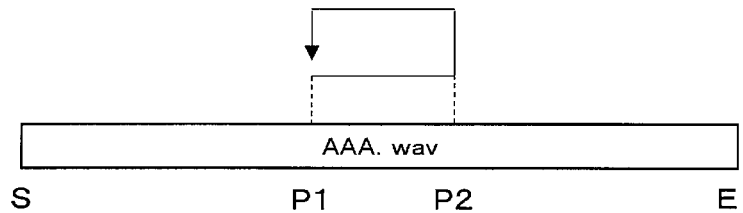
FIG. 7 is an explanatory diagram (part 1) of repeat reproduction of a particular segment.

FIG. 7 schematically shows repeat reproduction in this case. The user designates a segment P1-P2 between an arbitrary start point P1 and an arbitrary end point P2 between the start point S and the end point E of the audio file (for example, "AAA.WAV") as a repeat reproduction segment. The CPU 50 stores the start point P1 and the end point P2 in the memory, and starts reproduction from the start point P1 by one media player and sets the other media player to the wait state. At the timing when the reproduction by the one media player is completed at the end point P2, the wait state of the other media player is released, and the reproduction is immediately started from the start point P1, to achieve the repeat reproduction.

Figure 8:
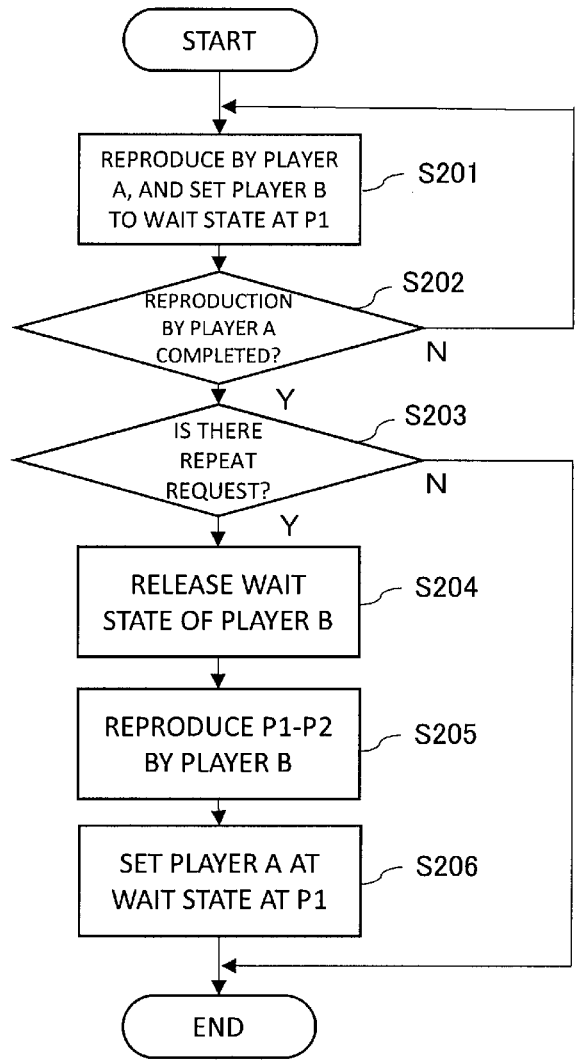
FIG. 8 is a process flowchart of repeat reproduction of a particular segment.

FIG. 8 shows a process flowchart of the CPU 50 in this case.

In response to a command from the user, the CPU 50 reproduces the audio file by the media player A from the start point P1, and sets the media player B to the wait state at the start point P1 of the audio file (S201).

Next, the CPU 50 judges whether or not reproduction by the media player A is completed (S202). That is, the CPU 50 judges whether or not the end point P2 of the audio file is reached. When the end point P2 of the audio file is not reached, the reproduction by the media player A is continued, and the media player B is maintained at the wait state at the start point P1 of the audio file, When the end point P2 of the audio file is reached and the reproduction by the media player A is completed, next, the CPU 50 judges wither or not there is a repeat request from the user (S203).

Regardless of the timing of the repeat request (regardless of whether the repeat request is made before the start of reproduction of the audio file or during the reproduction), the process is completed if there is no repeat request. In other words, for the media player A, the end process is executed and the media player A is stopped, and, for the media player B, the end process from the wait state is executed and the media player B is stopped.

On the other hand, when there is a repeat request, the CPU 50 releases the wait state of the media player B (S204), and starts reproduction of the audio file by the media player B from the start point P1 (S205). Further, the media player A is set to the wait state at the start point P1 of the audio file (S206). When the reproduction by the media player B is completed, the audio file is again reproduced by the media player A, and the media player B is set to the wait state at the start point P1.

In the present embodiment, a configuration is described in which two media players A and B are activated by one or a plurality of CPUs 50 to execute the reproduction. The present embodiment, however, is not limited to such a configuration, and three or more media players may be activated as necessary and according to the processing capabilities of the CPU 50 and the memory capacity, to execute the process.

Figure 9:
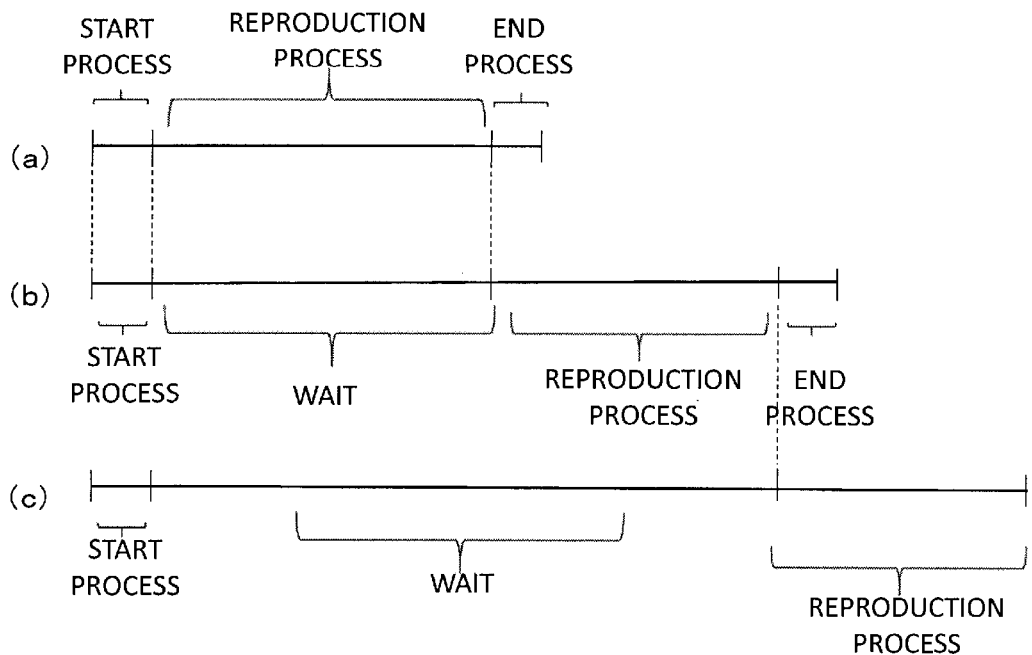
FIG. 9 is a timing chart showing execution states of three media players.

FIG. 9 shows a case where three media players A, B, and C are activated and the process is executed. FIG. 9A shows an execution state of the media player A, FIG. 9B shows an execution state of the media player B, and FIG. 9C shows an execution state of the media player C.

When a reproduction start command is received from the user, the CPU 50 activates the media players A, B, and C, and executes a predetermined start process. After completion of the start process, reproduction of the audio file from the start point by the media player A is started. The media players B and C are set to a wait state of reproduction from the start point, after the completion of the start process.

During the reproduction of the audio file by the media player A, the media players B and C are maintained in the wait state.

When an end point of the audio file is reached by the media player A and the reproduction of the audio file is completed, an end process for the media player A is executed. On the other hand, at this timing, the wait state of the media player B is released, and reproduction of the audio file from the start point by the media player B is started. The media player C is maintained at the wait state.

When the end point of the audio file is reached by the audio player B and the reproduction is completed, an end process for the media player B is executed. On the other hand, at this timing, the wait state of the media player C is released, and reproduction of the audio file from the start point is started by the media player C.

In this manner, by alternately reproducing the audio file by the media players A, B, and C also, the repeat reproduction can be enabled. Alternatively, the points where the media players B and C wait during the reproduction by the media player A may be set different from each other.

Figure 10:
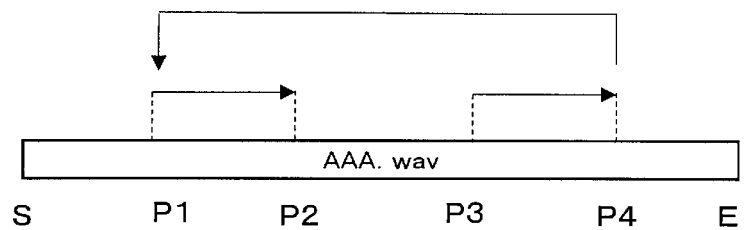
FIG. 10 is an explanatory diagram (part 2) of repeat reproduction of a particular segment.

FIG. 10 schematically shows another repeat reproduction. The user designates a segment P1-P2 between an arbitrary first start point P1 and an arbitrary first end point P2 between a start point S and an end point E of an audio file (for example, "AAA.WAV"), and a segment P3-P4 between a second start point P3 and a second end point P4 as repeat reproduction segments. Specifically, the repeat reproduction is a process in which, first, the segment P1-P2 is reproduced, then, the region from P2 to P3 is skipped, and the segment P3-P4 is reproduced, so that the reproduction of the P1-P2 and the reproduction of the P3-P4 are repeated.

In response to a command from the user, the CPU 50 reproduces the audio file by the media player A from the first start point P1, and sets the media player B to a wait state at the second start point P3 of the audio file.

Next, the CPU 50 completes the reproduction by the media player A when the first end point P2 is reached in the reproduction by the media player A, and, at the same time, releases the wait state of the media player B and starts reproduction of the audio file from the second start point P3 by the media player B. The media player A is set to a wait state at the first start point P1 of the audio file. When the second end point P4 is reached in the reproduction by the media player B, the wait state of the media player A is released, reproduction is started from the first start point P1, and the media player B is set to the wait state at the second start point P3.

Specifically, the configuration enables: reproduction of the segment P1-P2 by the media player A; and reproduction of the segment P3-P4 by the media player B, so that the segments can be repeatedly reproduced without an interruption by alternately setting the media players A and B to the reproduction state.

Figure 11:
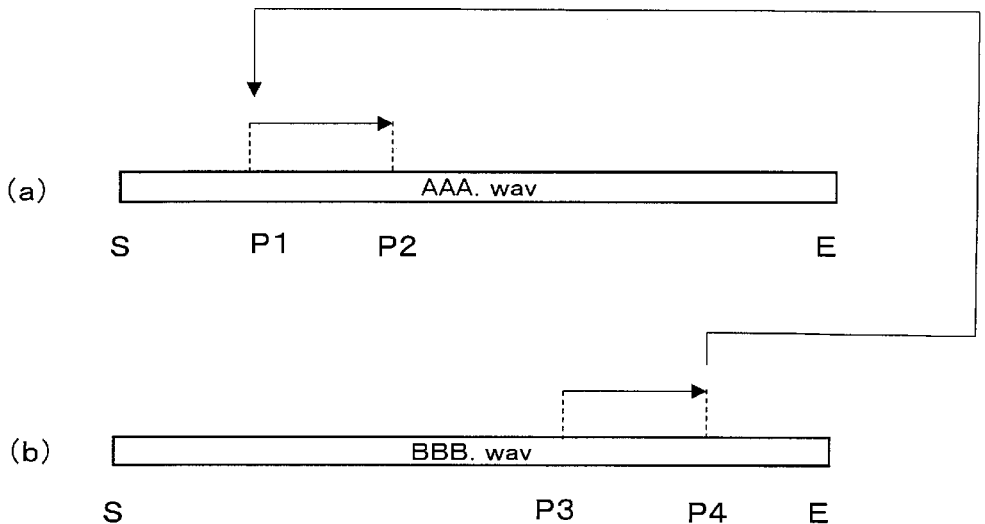
FIG. 11 is an explanatory diagram (part 3) of repeat reproduction of a particular segment.

FIG. 11 schematically shows another repeat reproduction. The user designates a segment P1-P2 between an arbitrary first starting point P1 and an arbitrary first end point P2 between a start point S and an end point E of an audio file (for example, "AAA.WAV"), and also designates a segment P3-P4 between an arbitrary second start point P3 and an arbitrary second end point P4 between a start point S and an end point E of another audio file (for example, "BBB.WAV"). The segments P1-P2 and P3-P4 are designated as the repeat reproduction segments. That is, a repeat reproduction is executed in which, first, the segment P1-P2 of the audio file "AAA.WAV" is first reproduced, then, the segment P3-P4 of the audio file "BBB.WAV" is reproduced, and the reproduction of the segment P1-P2 and subsequent reproduction of the segment P3-P4 are repeated.

In response to a command from the user, the CPU 50 reproduces the audio file "AAA.WAV" from the first start point P1 by the media player A, and sets the media player B to the wait state at the second start point P3 of the audio file "BBB.WAV."

Next, when the first end point P2 is reached by the reproduction by the media player A, the CPU 50 completes the reproduction by the media player A, and, at the same time, releases the wait state of the media player B and starts reproduction of the audio file "BBB.WAV" from the second start point P3 by the media player B. The media player A is set to the wait state at the first start point P1 of the audio file "AAA.WAV" When the second end point P4 is reached in the reproduction by the media player B, the wait state of the media player A is released, reproduction from the first start point P1 of the audio file "AAA.WAV" is started, and the media player B is set to the wait state at the second start point P3 of the audio file "BBB.WAV."

In FIG. 11, when the user designates a segment P5-P6 different from the segment P1-P2 in the audio file "AAA.WAV," and designates a repeat reproduction of P1-P2→P3-P4→P5-P6→P1-P2→ . . . , the segment P1-P2 may be reproduced by the media player A, the segment P3-P4 may be reproduced by the media player B, and the segment P5-P6 may be reproduced by the media player C. Specifically, during the reproduction of the segment P1-P2 by the media player A, the media player B is set to the wait state at the start point P3 and the media player C is set to the wait state at the start point P5. At the timing when the reproduction of the segment P1-P2 by the media player A is completed, the wait state of the media player B is released, and reproduction of the segment P3-P4 is started. At the timing when the reproduction of the segment P3-P4 by the media player B is completed, the wait state of the media player C is released and reproduction of the segment P5-P6 is started. At the timing when the reproduction of the segment P5-P6 by the media player C is completed, the wait state of the media player A is released and reproduction of the segment P1-P2 is started.

An embodiment of the present disclosure has been described. The present disclosure, however, is not limited to the above-described embodiment, and various modifications may be made. Alternative configurations will now be described.

<Alternative Configuration 1>

In the embodiment, an audio device is exemplified as the PC 10 which is connected to the audio interface device 14. The present disclosure is not limited to such a configuration, and may be applied to any audio device which reproduces an audio file which is built-in or supplied from the outside. Further, the "media player" in the embodiment may be any software or program module which can reproduce the audio file, and may reproduce the audio file by calling a sound driver provided by an operating system (OS) of the PC 10.

<Alternative Configuration 2>

In the embodiment, a plurality (for example, two) media players are activated corresponding to each of the immediate output switch 22. Alternatively, the plurality of media players may be activated only by a particular immediate output switch 22. Alternatively, the plurality of media players may be activated only by the immediate output switch 22 designated by the user.

<Alternative Configuration 3>

In the embodiment, during the reproduction by one of the media players, the other media player is set to the wait state at a desired position, and at the completion of the reproduction by the one media player, the wait state of the other media player is released and, immediately thereafter (without an interruption or a time lag), the reproduction is started. Alternatively, the wait state release timing of the other media player may be intentionally adjusted using a timer or the like, to intentionally introduce a time lag. It should be noted that the time lag in this case is not a time lag which is inevitably generated in the system structure, and is a time lag which can be adjusted (increased or reduced) by the user.

<Alternative Configuration 4>

In the embodiment, repeat reproduction of the audio file is described. Alternatively, when an arbitrary process to be executed by the CPU 50 is a job, and a software file which executes the job is an application (app), a plurality of apps of the same type may be activated when a certain job is executed, and during the execution of the job by one app, the other app may be set to the wait state at an arbitrary point of the job. At the timing of completion of the execution of the job by the one app, the wait state of the other app may be released and, immediately thereafter, the job may be started by the other app. Alternatively, when there are a first app and a second app which are highly likely to be executed consecutively, the second app may be activated in the background at the timing of activation of the first app, and may be maintained at the wait state, and the wait state of the second app may be released at the timing of completion of the execution of the first app. With such a configuration, the time lag in the switching between a plurality of apps may be resolved. In this case, the media player A in the embodiment may be considered to be the first player application which reproduces the audio file, and the media player B may be considered as a second player application which reproduces the audio file. "Multi-tasking" in computers is known, but the above-described configuration differs from multi-tasking in that the wait state of the second app is automatically (without the user recognizing) released at the timing of completion of the execution by the first app, and the execution by the second app is started.

<Alternative Configuration 5>

In the embodiment, a repeat reproduction is described in which, as shown in FIG. 10, the segment P1-P2 is reproduced, then, the region from P2 to P3 is skipped, the segment P3-P4 is reproduced, and the segment P1-P2 is repeatedly reproduced again. Alternatively, the structure may be similarly applied in a case where simply, the segment P1-P2 is reproduced, the region from P2 to P3 is skipped, the segment P3-P4 is reproduced, and the process is ended. This is similarly true for the configuration of FIG. 11. In other words, the present disclosure may be applied to repeat reproduction, skip reproduction, and any combination of the repeat reproduction and the skip reproduction.

The invention claimed is:

1. An information processor comprising:
a connector connected to a device that is external to the information processor;
a display device that displays a virtual switch corresponding to a switch of the device that is external to the information processor;
a storage unit that stores at least a first application and a second application that execute a job; and
a controller that:
activates the first application and the second application,
causes the first application to execute the job,
sets the second application to a wait state at a start point of the job during execution of the job by the first application,
determines whether execution of the job by the first application is completed,
determines whether a repeat execution request is received from the device that is external to the information processor, and
automatically releases the wait state of the second application, sets the first application to the wait state at the start point of the job, and causes the second application to execute the job in response to determining that the execution of the job by the first application is completed and determining that the repeat execution request is received.

2. An audio device comprising:
a connector connected to an audio interface device that is external to the audio device;
a display device that displays a virtual switch corresponding to a switch of the audio interface device that is external to the audio device;
a storage unit that stores at least a first player application and a second player application that reproduce an audio file; and
a controller that:
activates the first player application and the second player application,
causes the first player application to reproduce the audio file,
sets the second player application to a wait state at a start point of the audio file during reproduction of the audio file by the first player application,
determines whether reproduction of the audio file by the first player application is completed,
determines whether a repeat reproduction request is received from the audio interface device that is external to the audio device, and
automatically releases the wait state of the second player application, sets the first player application to the wait state at the start point of the audio file, and causes the second player application to start reproduction of the audio file in response to determining that the reproduction of the audio file by the first player application is completed and determining that the repeat reproduction request is received.

3. The audio device according to claim 2, wherein the controller is configured to:
cause the first player application to start reproduction of the audio file from a start point of the audio file and set the second player application to the wait state at the start point of the audio file;
determine whether reproduction of the audio file to an end point of the audio file by the first player application is completed;
in response to determining that the reproduction of the audio file to the end point of the audio file by the first player application is completed, automatically release the wait state of the second player application, cause the second player application to start reproduction of the audio file, and set the first player application to the wait state at the start point of the audio file;
determine whether reproduction of the audio file to the end point of the audio file by the second player application is completed; and
in response to determining that the reproduction of the audio file to the end point of the audio file by the second player application is completed, automatically release the wait state of the first player application and cause the first player application to start reproduction of the audio file at the start point of the audio file.

4. The audio device according to claim 2, wherein the controller is configured to:
cause the first player application to start reproduction of the audio file from an arbitrary start point of the audio file and set the second player application to the wait state at the start point of the audio file;
determine whether reproduction of the audio file to an arbitrary end point of the audio file by the first player application is completed;
in response to determining that the reproduction of the audio file to the arbitrary end point of the audio file by the first player application is completed, automatically release the wait state of the second player application, cause the second player application to start reproduction of the audio file from the start point of the audio file, and set the first player application to the wait state at the start point of the audio file;

determine whether reproduction of the audio file to the end point of the audio file by the second player application is completed; and in response to completion of the reproduction of the audio file to the end point of the audio file by the second player application is completed, automatically release the wait state of the first player application and cause the first player application to start reproduction of the audio file from the start point of the audio file.

5. The audio device according to claim 2, wherein the controller is configured to:

cause the first player application to start reproduction of the audio file from an arbitrary first start point of the audio file and set the second player application to the wait state at an arbitrary second start point of the audio file;

determine whether reproduction of the audio file to an arbitrary first end point of the audio file by the first player application is completed;

in response to determining that the reproduction of the audio file to the arbitrary first end point of the audio file by the first player application is completed, automatically release the wait state of the second player application, cause the second player application to start reproduction of the audio file from the second start point of the audio file, and set the first player application to the wait state at the first start point of the audio file;

determine whether reproduction of the audio file to an arbitrary second end point of the audio file by the second player application is completed; and in response to determining that the reproduction of the audio file to the arbitrary second end point of the audio file by the second player application is completed, automatically release the wait state of the first player application and cause the first player application to start reproduction of the audio file from the first start point of the audio file.

6. The audio device according to claim 2, wherein the controller is configured to:

cause the first player application to start reproduction of a first audio file from an arbitrary first start point of the first audio file and set the second player application to the wait state at an arbitrary second start point of a second audio file;

determine whether reproduction of the first audio file to an arbitrary first end point of the first audio file by the first player application is completed;

in response to determining that the reproduction of the first audio file to the arbitrary first end point of the first audio file by the first player application is completed, automatically release the wait state of the second player application, cause the second player application to start reproduction of the second audio file from the second start point of the second audio file, and set the first player application to the wait state at the first start point of the first audio file;

determine whether reproduction of the second audio file to an arbitrary second end point of the second audio file by the second player application is completed; and in response to determining that the reproduction of the second audio file to the arbitrary second end point of the second audio file by the second player application is completed, automatically release the wait state of the first player application and cause the first player application to start reproduction of the first audio file from the first start point of the first audio file.

7. The audio device according to claim 2, wherein the controller is configured to:

automatically release the wait state of the second player application and set a stopped state in response to determining that the reproduction of the audio file by the first player application is completed, and in response to determining that the repeat reproduction request is not received.

8. A non-transitory recording medium which stores a program which, when executed, causes a processor of a computer to:

display a virtual switch corresponding to a switch of a device that is external to the computer and connected to the computer by a connector;

activate at least a first player application and a second player application that reproduce an audio file;

cause the first player application to reproduce the audio file and set the second player application to a wait state at a start point of the audio file during reproduction of the audio file by the first player application;

determine whether reproduction of the audio file by the first player application is completed;

determine whether a repeat reproduction request is received from the device that is external to the computer; and in response to determining that the reproduction of the audio file by the first player application is completed and determining that the repeat reproduction request is received, set the first player application to the wait state at the start point of the audio file, automatically release the wait state of the second player application, and cause the second player application to start reproduction of the audio file.

* * * * *